United States Patent
Wänstedt et al.

(10) Patent No.: US 11,356,832 B2
(45) Date of Patent: Jun. 7, 2022

(54) MISSION CRITICAL PUSH TO TALK SERVICES

(71) Applicant: Telefonaktiebolaget LM Ericsson (publ), Stockholm (SE)

(72) Inventors: Stefan Wänstedt, Luleå (SE); Tommy Arngren, Södra Sunderby (SE); Tomas Jönsson, Luleå (SE); Peter Ökvist, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 132 days.

(21) Appl. No.: 16/492,718

(22) PCT Filed: Apr. 20, 2017

(86) PCT No.: PCT/EP2017/059356
§ 371 (c)(1),
(2) Date: Sep. 10, 2019

(87) PCT Pub. No.: WO2018/192656
PCT Pub. Date: Oct. 25, 2018

(65) Prior Publication Data
US 2021/0144536 A1    May 13, 2021

(51) Int. Cl.
*H04W 4/00* (2018.01)
*H04W 4/90* (2018.01)
(Continued)

(52) U.S. Cl.
CPC .............. *H04W 4/90* (2018.02); *H04W 4/10* (2013.01); *H04W 76/45* (2018.02); *H04W 76/50* (2018.02)

(58) Field of Classification Search
CPC ....... H04W 4/90; H04W 76/50; H04W 4/029; H04W 4/02
See application file for complete search history.

(56) References Cited

U.S. PATENT DOCUMENTS 8,175,225 B2 * 5/2012 Buscemi ............. H04M 3/4874
379/45
8,878,889 B1 * 11/2014 Kaupp .................... H04W 4/90
348/14.02
(Continued)

OTHER PUBLICATIONS

International Search Report and Written Opinion dated Nov. 22, 2017 for International Application No. PCT/EP2017/059356 filed on Apr. 20, 2017, consisting of 11-pages.
(Continued)

*Primary Examiner* — Omoniyi Obayanju
(74) *Attorney, Agent, or Firm* — Christopher & Weisberg, P.A.

(57) ABSTRACT

A method for enabling Mission Critical Push to Talk (MCPTT) services in a telecommunications network is presented. The method is performed by a mobile terminal (MT) and incudes receiving an imminent peril or emergency MCPTT call from at least one other MT, the call indicating an emergency state for the at least one other MT, determining a number of MTs indicating an emergency state, and raising an MCPTT emergency alert if the determined number of MTs indicating an emergency state exceeds a threshold. An MT, an escalation server, a computer program, and a computer program product are also presented.

20 Claims, 5 Drawing Sheets

(51) Int. Cl.
*H04W 76/50* (2018.01)
*H04W 76/45* (2018.01)
*H04W 4/10* (2009.01)

(56) References Cited

U.S. PATENT DOCUMENTS

| | | | |
|---|---|---|---|
| 2010/0279647 A1* | 11/2010 | Jacobs | H04W 4/90 455/404.1 |
| 2014/0162583 A1 | 6/2014 | Daly et al. | |
| 2015/0271655 A1* | 9/2015 | Jatavallabhula | H04W 4/90 455/404.1 |
| 2016/0266733 A1* | 9/2016 | Alon | G06Q 10/10 |

OTHER PUBLICATIONS

3GPP TS 23.379 V14.0.0; 3rd Generation Partnership Project; Technical Specification Group Services and System Aspects; Functional architecture and information flows to support Mission Critical Push to Talk (MCPTT); Stage 2 (Release 14); Dec. 2016, consisting of 184-pages.

3GPP TR 23.779 V13.0.0; 3rd Generation Partnership Project; Technical Specification Group Services and System Aspects; Study on application architecture to support Mission Critical Push to Talk over LTE (MCPTT) services (Release 13); Sep. 2015, consisting of 251-pages.

* cited by examiner

MISSION CRITICAL PUSH TO TALK SERVICES

CROSS-REFERENCE TO RELATED APPLICATIONS

This application is a Submission Under 35 U.S.C. § 371 for U.S. National Stage Patent Application of International Application Number: PCT/EP2017/059356, filed Apr. 20, 2017 entitled "MISSION CRITICAL PUSH TO TALK SERVICES," the entirety of which is incorporated herein by reference.

TECHNICAL FIELD

The invention relates to methods for enabling Mission Critical Push to Talk (MCPTT) services in a telecommunications network, a mobile terminal for enabling MCPTT services in a telecommunications network, an escalation server for enabling MCPTT services in a telecommunications network, corresponding computer programs, and corresponding computer program products.

BACKGROUND

There exists a framework for communication between public-safety personnel using mobile terminals (MTs) for MCPTT services, e.g., in situations when a user is in danger. By virtue of MCPTT, special modes of operation are invoked.

A Push To Talk (PTT) service provides an arbitrated method to enable communication between two or more users. Traditionally, users may request permission to transmit by, e.g., pressing a button. A MCPTT over long-term evolution (LTE) service is basically an enhanced PTT service, suitable for mission critical scenarios, based upon 3rd Generation Partnership Project (3GPP) Evolved Packet System (EPS) services, e.g., to establish, maintain, and terminate actual communication path(s). However, MCPTT can also form the basis for a general commercial PTT service. MCPTT makes use of capabilities included in Group Communications System Enablers for LTE (GCSE_LTE) and Proximity Services (ProSe), with additional requirements specific to the MCPTT Service.

The MCPTT service is intended to provide a real-time priority and Quality of Service (QoS) experience for MCPTT calls, as public-safety users or responders have significant dynamic operational conditions that determine their priority. For example, a type of incident a responder is serving or a responder's overall role needs to influence the responder's ability to obtain resources from the LTE system.

Another feature of MCPTT is transparency of interactions between the users and the system. A first responder that needs to change the QoS of his communication is not to be distracted from his mission due to complicated MT behaviour or service interactions. Instead, the service acts in an anticipatory and adaptive manner to provide the proper quality of experience to the user, automatically, or with simple and minimal interaction.

The mission critical service is also expected to provide the ability to interface with public-safety systems (e.g., Computer Aided Dispatch) in order to determine the user's state (e.g., incident severity), environment and conditions as well as to affect the most appropriate priority and QoS experience for the user.

Emergency Group Call and Imminent Peril group call are different types of Group Calls in MCPTT that provide a user with elevated priority towards other users and will have prioritized access to resources. Emergency Private Call similarly provides elevated priority to resources.

An MT initiating emergency procedures sends an Emergency Alert, i.e., a notification of an emergency situation regardless if the user is signed in with the MCPTT Service or not. The Emergency Alert is initiated from the MT to inform the MCPTT Service of the user's immediate need of assistance due to a life-threatening situation. The idea is that the user initiates this notification by actuating a user interface on the MT. The notification includes the User's ID, potentially a Group ID, the user's Mission Critical Organization name, and the most current location available for the user's MT.

Imminent Peril group call is differentiated from an Emergency Group Call based on for whom the assistance is required. The Imminent Peril group call is initiated by a user for assistance to other users or persons of the general public observed to be in trouble and may soon need assistance.

Many existing devices contain sensors for detecting biometric measurements of a user of the device. Examples of such measurements may be heart rate, blood pressure/oxygen saturation, temperature, sweat, etc. An MT also often includes accelerometers and/or optical gyros that control the position of the MT. It is possible, based on such measurements, to estimate the physical wellbeing of a user, such as whether the user suffers from sudden medical condition, high stress levels, the user falls, etc.

An MT is often equipped with a camera and ambient light sensors that can be used to "see" what the environment looks like, e.g., whether the location is dark. More elaborated, MT ambient light sensors could be used to distinguish whether the measured power spectrum distribution indicates a potentially hazardous situation; e.g., in case of fire, the ambient light sensor could report a more IR-shifted spectrum profile.

MTs can be equipped with environmental sensors for measuring, e.g., temperature, barometric pressure, light, and radiation sensor.

SUMMARY

An object of the invention is how to improve decision support for MCPTT services in a telecommunications network.

According to a first aspect, there is presented a method for enabling MCPTT services in a telecommunications network. The method is performed by an MT and comprises receiving an imminent peril or emergency MCPTT call from at least one other MT, the call indicating an emergency state for the at least one other MT, determining a number of MTs indicating an emergency state, and raising an MCPTT emergency alert if the determined number of MTs indicating an emergency state exceeds a threshold. By the first aspect, decision support is improved by the MT automatically raising an MCPTT emergency alert when the determined number of MTs indicating an emergency state exceeds a threshold.

The method may further comprise sending the raised MCPTT emergency alert to a dispatcher through the telecommunications network.

The MT may be one of the number of MTs indicating an emergency state.

The threshold may be a number of MTs.

The threshold may be a fraction of a total number of MTs in a MCPTT group. The method may further comprise sending an MCPTT emergency alert to another MT, wherein the other MT and the MT belong to different MCPTT groups.

The telecommunications network may be an LTE network.

The imminent peril or emergency MCPTT call may be received as an Off-network MCPTT service.

The emergency state may be determined by sensor readings made by the MTs.

According to a second aspect, there is presented a method for enabling MCPTT services in a telecommunications network. The method is performed by an escalation server in the telecommunications network and comprises receiving an imminent peril or emergency call from at least two proximate MTs, the calls indicating a respective emergency state for the at least two proximate MTs, determining a number of MTs indicating an emergency state, and raising an MCPTT emergency alert if the determined number of MTs indicating an emergency state exceeds a threshold. By the second aspect, decision support is improved by the escalation server automatically raising an MCPTT emergency alert when the determined number of MTs indicating an emergency state exceeds a threshold.

The method may further comprise sending the raised MCPTT emergency alert to a dispatcher through the telecommunications network.

The threshold may be a number of MTs.

The threshold may be a fraction of total number of MTs in a MCPTT group.

The telecommunications network may be an LTE network.

According to a third embodiment, there is presented an MT for enabling MCPTT services in a telecommunications network. The MT comprises a processor, and a memory. The memory stores instructions that, when executed by the processor, causes the MT to receive an imminent peril or emergency MCPTT call from at least one other MT, the call indicating an emergency state for the at least one other MT, to determine a number of MTs indicating an emergency state, and to raise an MCPTT emergency alert if the determined number of MTs indicating an emergency state exceeds a threshold.

According to a fourth aspect, there is presented an escalation server for enabling MCPTT services in a telecommunications network. The escalation server comprises a processor, and a memory. The memory stores instructions that, when executed by the processor, causes the escalation server to receive an imminent peril or emergency call from at least two proximate MTs, the calls indicating a respective emergency state for the at least two proximate MTs, to determine a number of MTs indicating an emergency state, and to raise an MCPTT emergency alert if the determined number of MTs indicating an emergency state exceeds a threshold.

According to a fifth aspect, there is presented a MT for enabling MCPTT services in a telecommunications network. The MT comprises a communication manager for receiving an imminent peril or emergency MCPTT call from at least one other MT, the call indicating an emergency state for the at least one other MT, and a determination manager for determining a number of MTs indicating an emergency state, and for raising an MCPTT emergency alert if the determined number of MTs indicating an emergency state exceeds a threshold.

According to a sixth aspect, there is presented an escalation server for enabling MCPTT services in a telecommunications network. The escalation server comprises a communication manager for receiving an imminent peril or emergency call from at least two proximate MTs, the calls indicating a respective emergency state for the at least two proximate MTs, and a determination manager for determining a number of MTs indicating an emergency state, and for raising an MCPTT emergency alert is the determined number of MTs indicating an emergency state exceeds a threshold.

According to a seventh aspect, there is presented a computer program for enabling MCPTT services in a telecommunications network. The computer program comprises computer program code which, when run on an MT, causes the MT to receive an imminent peril or emergency MCPTT call from at least one other MT, the call indicating an emergency state for the at least one other MT, to determine a number of MTs indicating an emergency state, and to raise an MCPTT emergency alert if the determined number of MTs indicating an emergency state exceeds a threshold.

According to an eighth aspect, there is presented a computer program for enabling MCPTT services in a telecommunications network. The computer program comprises computer program code which, when run on an escalation server, causes the escalation server to receive an imminent peril or emergency call from at least two proximate mobile terminals, MTs, the calls indicating a respective emergency state for the at least two proximate MTs, to determine a number of MTs indicating an emergency state, and to raise an MCPTT emergency alert if the determined number of MTs indicating an emergency state exceeds a threshold.

A computer program product comprising a computer program and a computer readable storage means on which the computer program is stored, is also presented.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
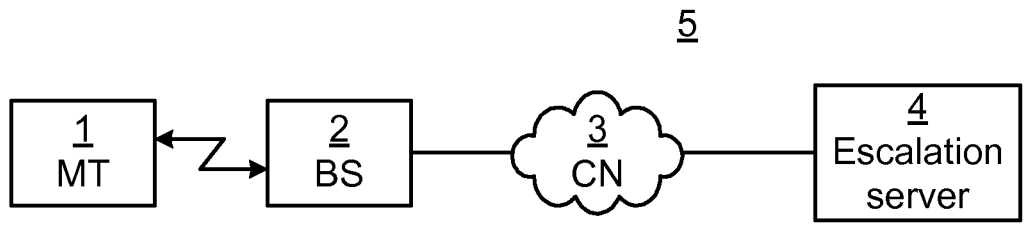
FIG. 1 schematically illustrates an environment wherein embodiments described herein can be implemented.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

A user generally needs to press a button before utilizing, e.g., talking, MCPTT services. There may, e.g., be a dedicated button for starting an emergency call. In any case some action is needed to be taken by the user. It may, however, be the case that a user in an emergency or in a distressed situation does not have the capability to perform a manual action for initiating an emergency call. In even more severe cases, a user might not be able to judge that an emergency situation has emerged, whereas sensors could identify that a hazardous situation is rapidly emerging. Even though the situation for an individual user may be severe enough, an emergency that affects a group of users may be worse.

An MT may monitor the well-being of a user within a group and the user surroundings, based on several different biometric and environmental sensors in the MT. An algorithm may, based on the input from these sensors, determine that one or several users are in poor physical and physiological shape or that the surroundings pose a threat to the user or to the group of users. The MT may, e.g., be a mobile phone, a mobile terminal, a user equipment (UE), a smartphone, a smartwatch, or a wearable device.

If the number of affected users is large, e.g., within a group of users or several groups of users, or for a limited area, there may be a need for an escalation (imminent peril) of distress. Escalation may e.g., be triggered if more than one MT within a group has sent an emergency message, autonomously or manually. An escalation message comprising an MCPTT emergency alert may, e.g., be sent to a ProSe server or a higher-level dispatcher. A threshold may also be set as a ratio of affected users to unaffected users in a group. There may be thresholds for several of biometric and environmental sensor readings that separately or together would lead to an escalation.

An algorithm (in the MT) may be able to distinguish between if the user is in an emergency state or if there is imminent peril for others in the group and then initiate raising of an MCPTT emergency alert accordingly.

The escalation message can be sent from an unaffected MT in the group, an MT from another group or from an MT that has declared emergency.

Embodiments are presented that enable detection of group emergency and escalation of emergency to central dispatcher.

Each MT capable of public-safety MCPTT is assumed to be equipped with biometric sensors. The biometric sensors can measure and record, e.g., pulse rate, blood pressure, temperature, moisture, finger prints, etc. It may also be possible in that the sensors are able to perform blood tests, e.g., blood glucose level, oxygen saturation, various toxins, etc. Further, the MT may be equipped with environmental sensors that record a number of environmental or situational variables, such as light (via camera), position, acceleration, speed, etc.

The existence of such biometric and environmental sensors in an MT can be used for many different operations, e.g., user authentication and general health status checks.

Figure 2:
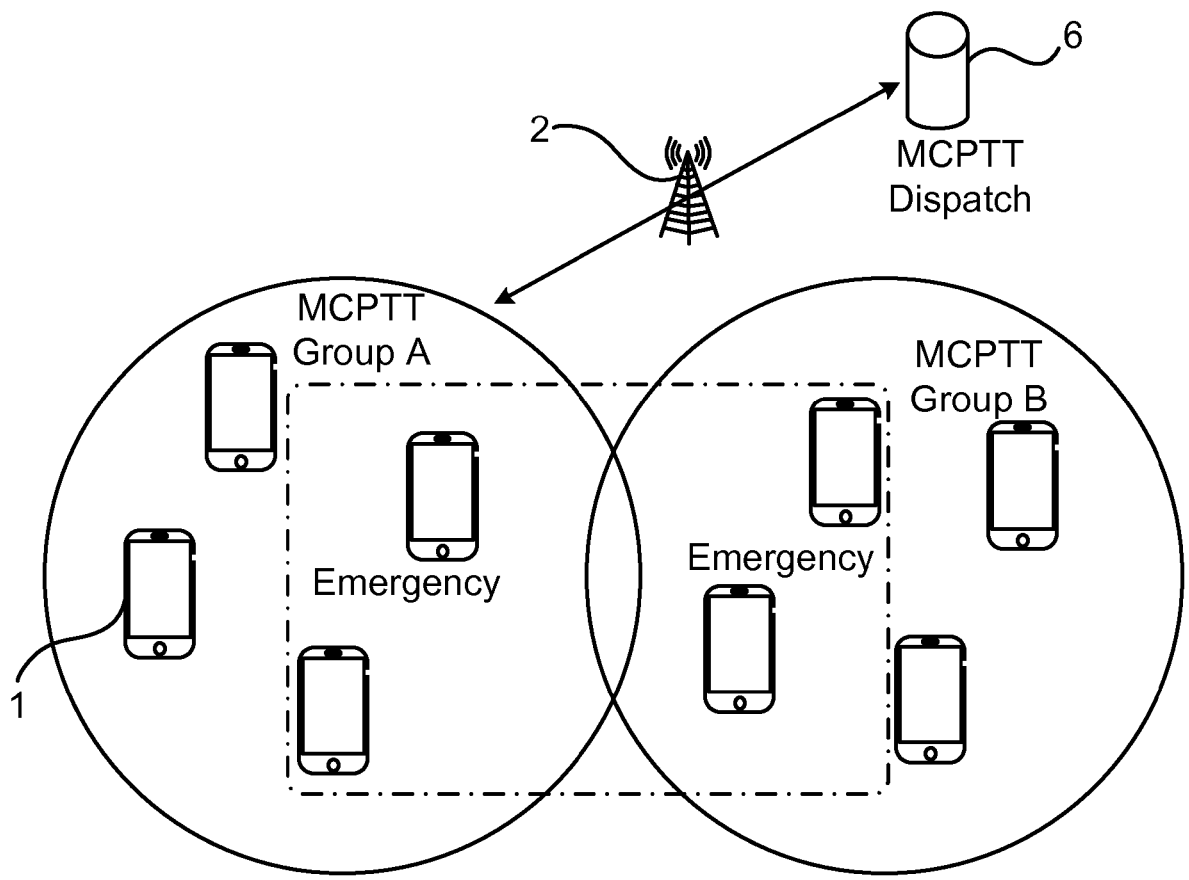
FIG. 2 is a schematic diagram illustrating an embodiment for MCPTT services presented herein.

The MT may be used to autonomously trigger an emergency state and to send emergency messages within a group or to a central dispatch. A user may alternatively or additionally manually trigger an emergency state. An MT may then determine if there is an emergency/imminent peril situation involving more than one user within a group, and an MT can trigger an escalation if several MTs or even groups of MTs all trigger emergency from a limited area, such as within their reach of transmitter or within a geofence, during a limited period of time, e.g. dependent on type and size of emergency (fire, accident, robbery) or fixed to specific time such as five minutes. FIG. 2 illustrates a group emergency between parts of separate MCPTT groups, group A and group B. Indications of emergency states for two MTs of group A and for two MTs of group B together raises an MCPTT emergency alert, which is sent through the telecommunications network to a MCPTT dispatcher.

Each MT may continuously monitor the health state of the user of the MT and environmental data from the close surroundings of the MT. The health state and environmental data may be monitored through sensors as described earlier.

A normal state for a user may be calibrated with a specific user under predefined, well controlled tests. A normal state may alternatively be based on statistics from general medical testing. Biometric readings may then have a normal state, i.e., the user is well and safe. There may be at least one threshold after which the health state is not considered normal state, such as heartrate, blood pressure, or body temperature above/below a calibrated normal level. There may also be multiple thresholds, e.g., one threshold for each biometric reading (or sensor). When one, or multiple, or sufficient number of, thresholds are exceeded, the MT may derive that the user has entered an abnormal state. There may be several threshold levels, such as for abnormal state, critical state, dangerous state, and emergency state, each representing various degrees of user health deterioration. There may also exist environmental data thresholds, such as for temperature close to user, body position (lying down), motion (no motion), which may also be combined with the health state thresholds.

At one of these states the MT may be set in an emergency state. At that point in time the MT may set a priority flag to emergency. In reality this means that the priority of all transmissions coming from the MT of this specific user will have the highest priority class in MCPTT calls and in telecommunications network.

When an MT is set in emergency state by the biometric measurements mentioned above, a timer may be started, and in case the user does not manually trigger an emergency call transmission herself before the timer expires, the MT may autonomously trigger an emergency call transmission.

One reason for such an emergency call transmission may be to signal the exact coordinates of the MT at the time of the distress. Another reason may be to forward biometric data and relevant environmental data to the other users in a group and possibly to a central node, such as a ProSe server. The escalation server may implement as a function within the ProSe server, or may be implemented as a server separate from the ProSe server.

If several users in a group send an emergency MCPTT call in a selected set of biometrical readings available in the MT, a state of imminent peril may be declared for the group. Environmental sensors may also be used to identify that a similar hazardous situation has emerged for multiple users. For example, similar presence of infrared (IR) spectrum may indicate a fire that the group is exposed to, or similar presence of zero gravity may indicate a free fall that the group is exposed to (e.g., if a building collapses).

With imminent peril determined for the MCPTT group, an MCPTT emergency alert may be raised. If an MT is in offline mode it may send an emergency MCPTT call to other MCPTT MTs within it group and/or to proximate MCPTT MTs, or if being online it may send an emergency alert directly to an MCPTT group dispatcher. A MCPTT group dispatcher may in this way be informed of an emergency alert and trigger a response action required to cope with a potentially larger accident.

An example is a group of firefighters entering a building that collapses, and in that scenario, a more far-reaching response will likely be required compared to if the building does not collapse.

Figure 3:
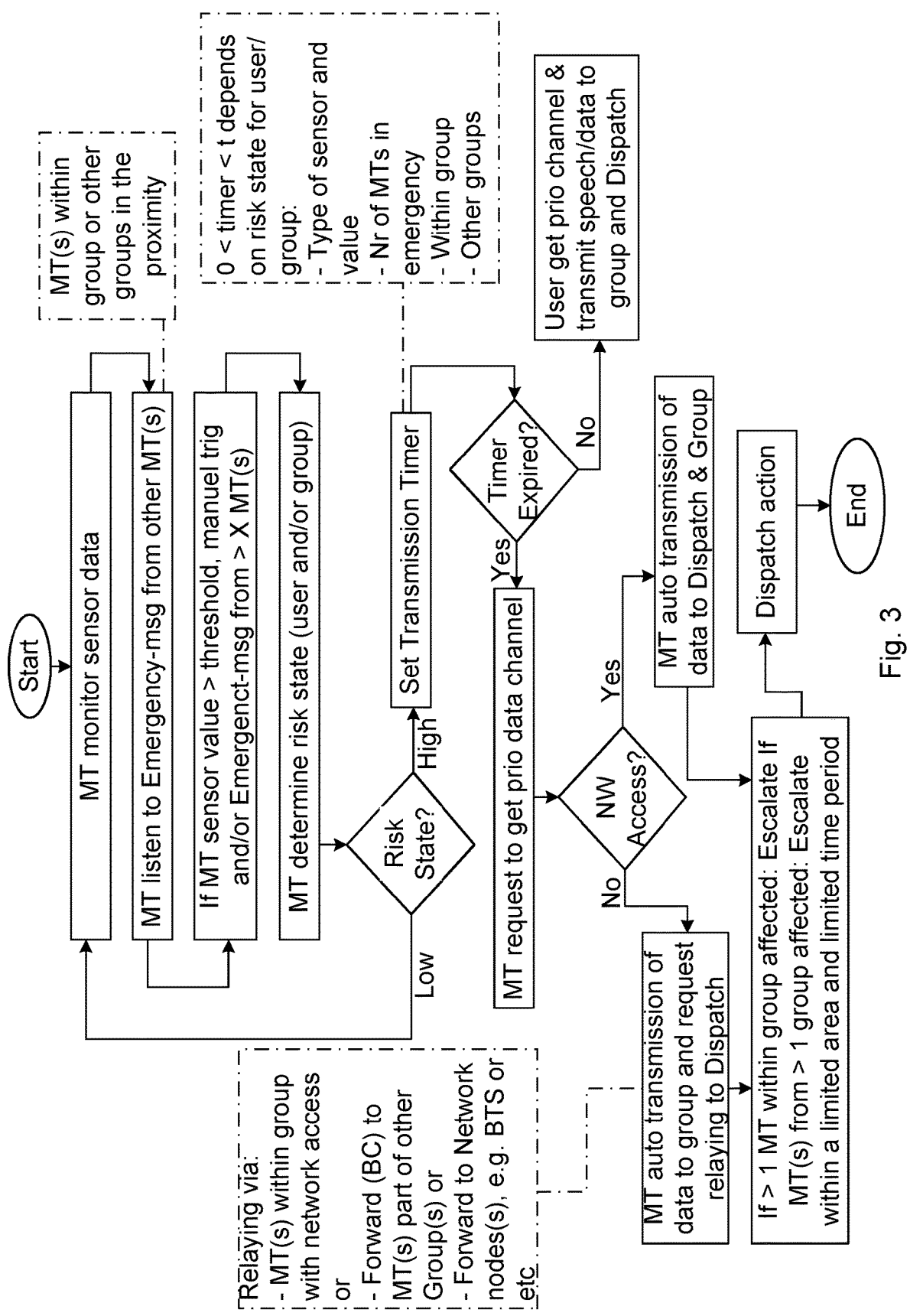
FIG. 3 is a flowchart illustrating an embodiment for MCPTT services presented herein.

If biometric readings of several MTs or even of groups of MTs all trigger emergency state within a limited area during a limited period of time, this will most likely require a more significant effort rather than just rescuing one or more individuals. If the number of affected users is large, users of several groups or uses in a limited area, it may also be the case that the situation cannot be handled by the groups themselves but there is a need for an escalation. A way to trigger an escalation is to detect the number of MTs in a group that has declared an emergency state, an example of which is illustrated in FIG. 3. When the number of users is higher than a threshold, e.g., more than one user, an MCPTT emergency alert is raised and sent to an escalation server or a high level dispatcher. The threshold may also be set as a ratio of affected users to unaffected users in a group. Alternatively, there may be thresholds for several of biometric and environmental readings that separately or together would lead to an escalation.

When an unaffected MT in the group, i.e., an MT which is not transmitting distress signals, detects that a number of the group members are signalling distress, the unaffected MT may send a MCPTT emergency alert to a dispatcher through a telecommunication network. The network may identify the signal and, e.g., contact other National Security Public Safety, NSPS, instances. There may be a dedicated network function, such as an escalation server, that actively listens for distress signalling. An unaffected MT may react to a distress signal, and relay the received distress signal to other group members. An unaffected MT may react to a distress signal including a flag for imminent peril, and relay the received distress signal to other group members, but also to other NSPS functions and/or relevant functions in nearby communities, and/or to other NSPS groups in the area.

In case there is a specific biometric that is triggered from many MTs in a limited area during a limited period time, the conclusion may be that many/all of these users need individual assistance. However, the remedy to the situation may not be a number of separate actions to individual users but instead a large coordinated effort.

In a cell in a telecommunication network where several carriers are available (e.g., in a deployment with carrier aggregation), and if there is a large group of users under emergency communication, an evolved Node B (eNB) can move the emergency communication to one carrier and spread out other users to other carriers. In this way other important traffic (non-emergency) will be able to continue without having to wait until resources allocated for the emergency communication are released.

An MT that has been relocated to a non-emergency carrier should still have a mechanism to listen to the emergency communication, at least periodically. This to ensure that when the situation becomes normal again, i.e., when there is no need to allocate resources to NSPS users, the MT on non-emergency carriers may return to their own public land mobile network (PLMN).

In an example illustrated with reference to FIG. 4, several fire and rescue departments are involved in a dangerous search and rescue action during a fire in a large shopping mall, and the telecommunication network access is very unstable.

Suddenly several MTs 1 within the same group (MCPTT Group A) transmit distress signals triggered by biometrical sensors in the MTs or manually triggered by the users. Some MTs in the group have network access (they are online), and some MTs in the group have no network access (they are offline). The MTs within the group which do not have network access (offline) send requests for relaying of data. Usually device-to-device (D2D) signals are possibly to decode by users within the same group. However, when a distress signal is sent all MTs close enough to receive the signal, the MTs will be able to decode the data.

All distress signals are sent within a limited area and within a limited period of time. Any node capable of receiving the transmissions, e.g., another MT or an escalation server, will know that an imminent peril situation has been initiated.

One MT within MCPTT group A is in this case unaffected and has network access. The unaffected MT determines an emergency state for the group and raises an MCPTT emergency alert based on the number of distress signals from the group, within a limited area and a limited period of time.

The unaffected MT may relay all distress signals to a regional dispatcher. The regional dispatcher can then take necessary action.

Figure 4:
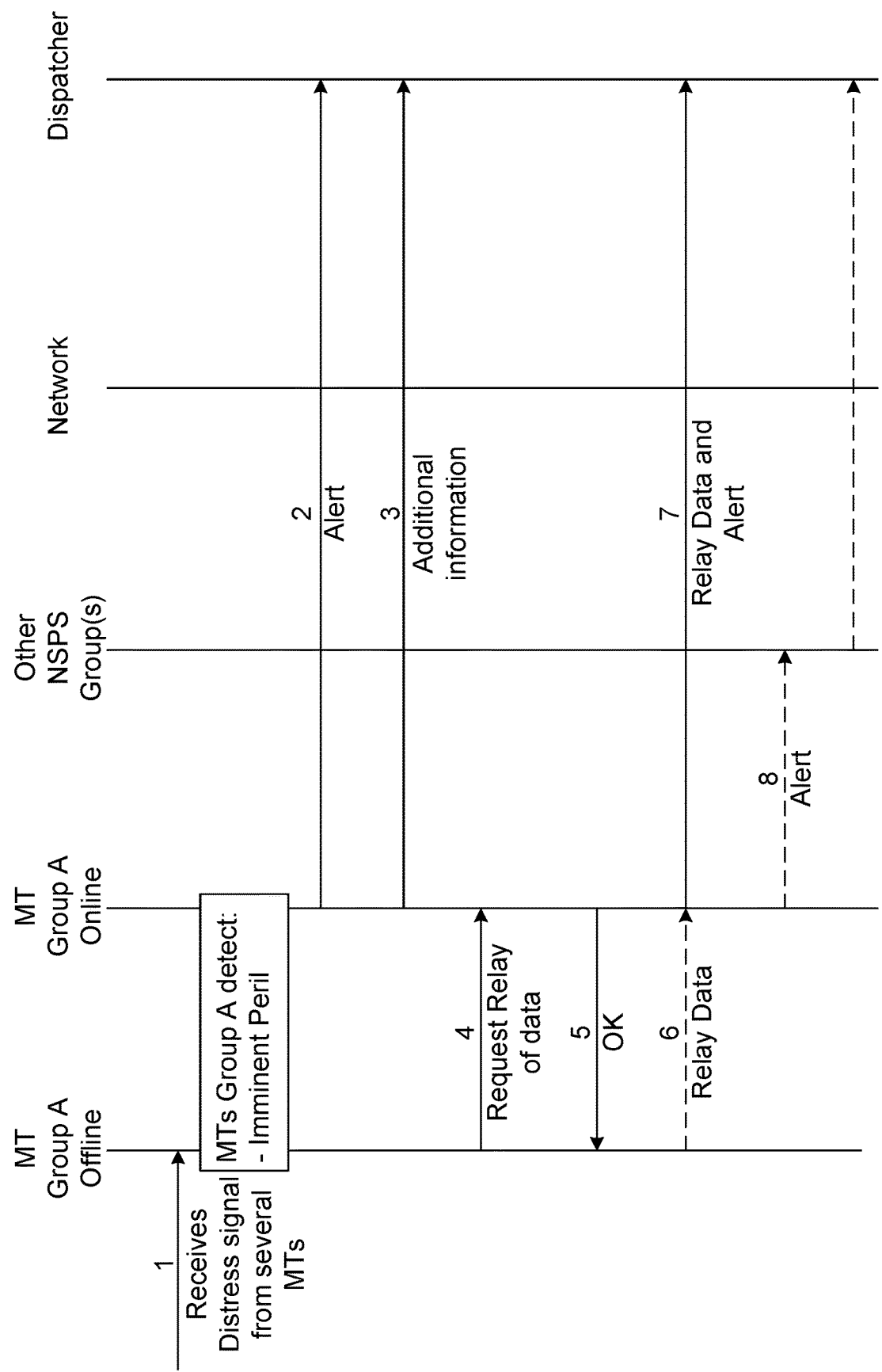
FIG. 4 is a signalling diagram, schematically illustrating an embodiment for MCPTT services presented herein.

The following protocols and messages are used according to this embodiment, which is illustrated in FIG. 4.

1. Each MT in distress sends a message containing a flag to let other MTs (i.e., MCPTT group members) know that an emergency has occurred. As with normal communication a media access control (MAC) header may include [user_id, group_id, Emergency_flag].

The Emergency_flag may be a separate entity, but it may also be signalled with the group_id field by defining a group ID for emergency transmissions and imminent peril, respectively (when an MT signals emergency all MTs need to be able to receive the transmission, hence, using a separate group_id for emergency may be used).

2. MTs detect a situation where several users are in danger. An MT with network access sends a message to a central dispatcher. The MAC header may now include [user_id, group_id, (number_of_UEs_in_distress), Emergency_flag]. The transmission may further include information on number of MTs, however, given the threshold in the receiving node (i.e., MT) the dispatcher already may know that the number is higher than the threshold.

3. An MT with network access may send additional information in the payload [user_id, group_id(1 . . . n), number_of_UEs_in_distress, sensor_data, time_stamp, location, emergency_flag]. The additional information may alternatively be sent in subsequent message(s) with more information whenever needed.

4. An MT that lacks network access may automatically or manually request for relaying of data via an MT with network access. E.g., a HyperText Transfer Protocol (HTTP) request message [user_id, group_id, emergency_flag, relay_request] may be used.

5. An MT within the group with network access accepts the request relaying of data.

6. Data from the MT that lacks network access is relayed to the MT having network access.

7. The relayed data is forwarded to the central dispatcher.

8. The MT that relay the data may also send an alert message to other NSPS groups.

There may be a dedicated function in the telecommunications network that actively listens for distress signalling, e.g., an escalation server. A termination of the "alert" signalling depends on the situation. In the case described herein the MT may decode all distress signals and determine that the situation is difficult and in need of escalation, and then signal the relevant network node that action is required. It may also be so that that MT relays all distress signals to the escalation server and thereby forwarding the responsibility to determine the severity of the situation to the network node. The latter case may be more secure since it is then difficult for a single MT to send false information interpreted incorrectly at the network node. However, forwarding all messages to the network node requires sending more data, which may be difficult (and take more time) if the MT has a poor network connection. Signalling may be sent on different levels, e.g., as a MAC control element (CE) on layer 2.

Sending the information on a higher layer, (such as through Internet protocol (IP), makes it easier to include more information. A message may first be sent (as robustly as possible) initiating "alert" with the number of affected MTs and group ID. Additional information may then be sent in subsequent transmissions, e.g., MT ID, position, biometrics that triggered the situation, etc.

Figure 5:
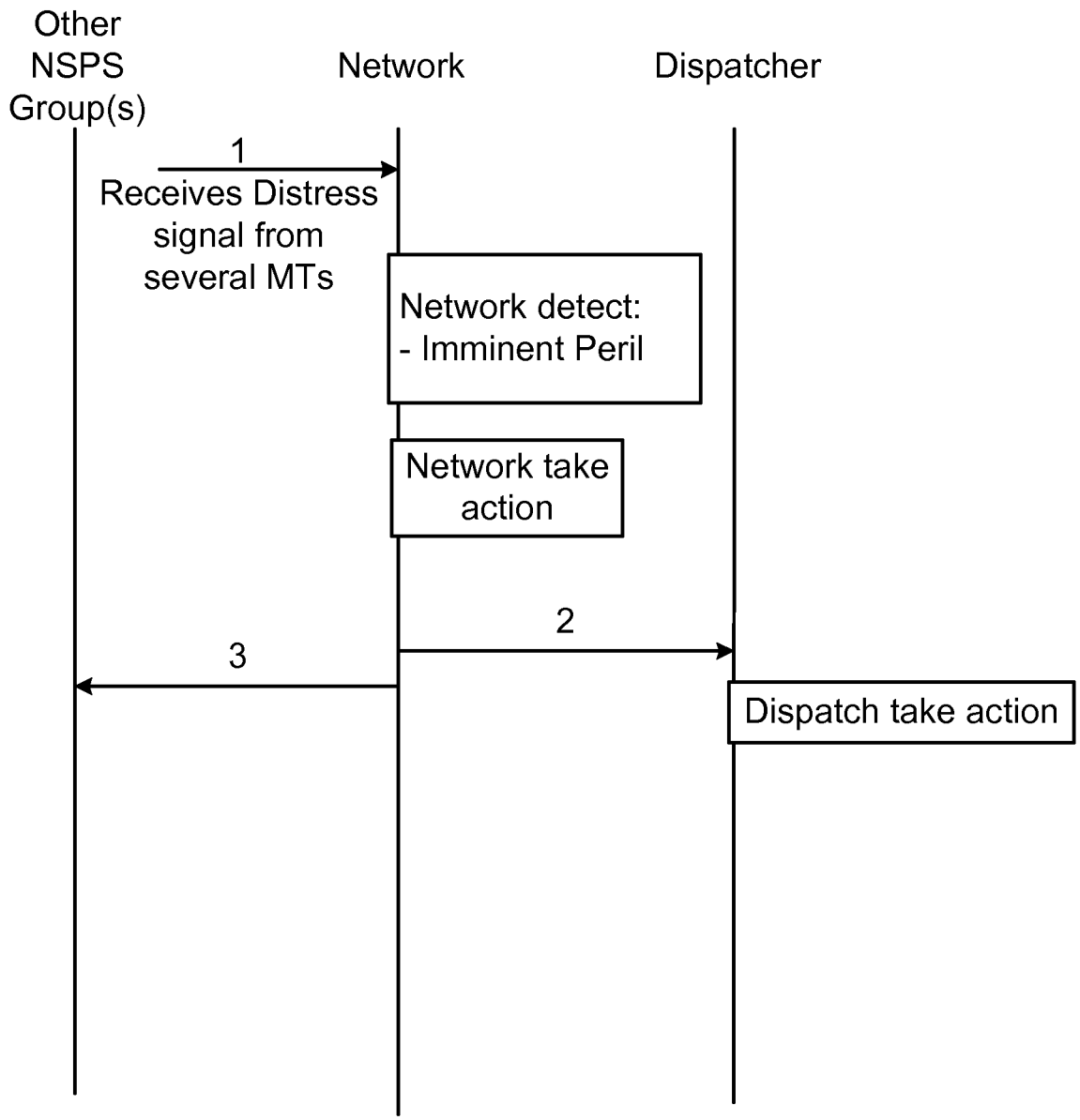
FIG. 5 is a signalling diagram, schematically illustrating an embodiment for MCPTT services presented herein.

An embodiment illustrating signalling to an escalation server is illustrated in FIG. 5.

1. MTs in distress signal this in a MAC header of a MCPTT transmission to the network. The header may include [user_id, group_id, Emergency_flag]. The escalation server detects an "alert" situation and decide to take escalation action by raising an MCPTT emergency alert.

2. The escalation server forwards the MCPTT transmissions with MAC headers to a central dispatcher, the header including [user_id:s, group_id:s, alert_flag].

3. Optionally, the escalation server may also notify other NSPS groups in proximity of the escalation, i.e., within the same limited area as the MCPTT group.

A telecommunication network 5, wherein embodiments described herein can be implemented is presented in FIG. 1. An MT 1 is wirelessly connectable to a base station (BS) 2. The BS 2 is connected to a core network 3. An escalation server 4 is connected to the core network 3.

Figure 6:
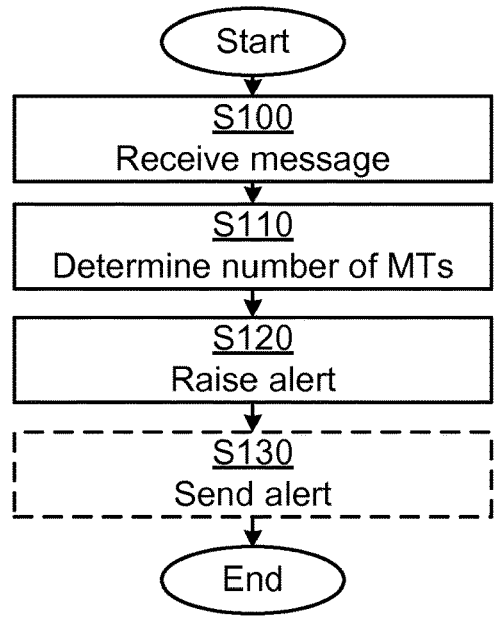
FIG. 6 is a flowchart illustrating an embodiment for MCPTT services presented herein.

A method, according to an embodiment, for enabling MCPTT services in a telecommunications network 5, is presented with reference to FIG. 6. The method is performed by an MT 1 and comprises receiving S100 an imminent peril or emergency MCPTT call from at least one other MT, the call indicating an emergency state for the at least one other MT, determining S110 a number of MTs indicating an emergency state, and raising S120 an MCPTT emergency alert in response to the determined number of MTs indicating an emergency state exceeding a threshold.

The method may further comprise sending S130 the raised MCPTT emergency alert to a dispatcher through the telecommunications network.

The MT may be one of the number of MTs indicating an emergency state.

The threshold may be a number of MTs.

The threshold may be a fraction of a total number of MTs in a MCPTT group.

The method further comprise sending S130 an MCPTT emergency alert to another MT, wherein the other MT and the MT belong to different MCPTT groups.

The telecommunications network may be an LTE network.

The imminent peril or emergency call may be received as an Off-network MCPTT service.

The emergency state may be determined by sensor readings made by the MTs.

A method, according to an embodiment, for enabling MCPTT services in a telecommunications network 5, is presented also with reference to FIG. 6. The method is performed by an escalation server 4 in the telecommunications network and comprises receiving S100 an imminent peril or emergency call from at least two proximate MTs, the calls indicating a respective emergency state for the at least two proximate MTs, determining S110 a number of MTs indicating an emergency state, and raising S120 an MCPTT emergency alert if the determined number of MTs indicating an emergency state exceeds a threshold.

The method may further comprise sending S130 the raised MCPTT emergency alert to a dispatcher through the telecommunications network.

The threshold may be a number of MTs.

The threshold may be a fraction of total number of MTs in a MCPTT group.

The telecommunications network may be an LTE network.

Figure 7:
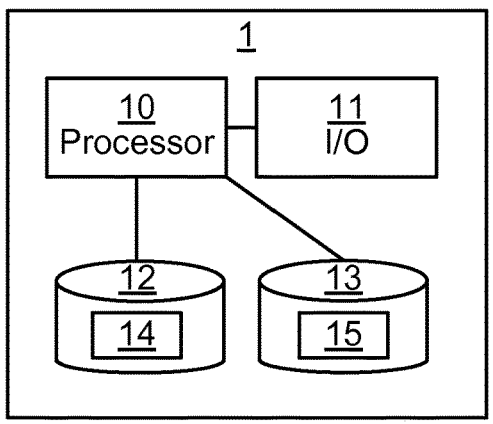
FIG. 7 is a schematic diagram illustrating some components of an MT presented herein.

An MT, according to an embodiment, for enabling MCPTT services in a telecommunications network 5, is presented with reference to FIG. 7. The MT 1 comprises a processor 10, and a memory 12, 13 storing instructions that, when executed by the processor, cause the MT to, receive S100 an imminent peril or emergency MCPTT call from at least one other MT, the call indicating an emergency state for the at least one other MT, to determine S110 a number of MTs indicating an emergency state, and to raise S120 an MCPTT emergency alert if the determined number of MTs indicating an emergency state exceeds a threshold.

Figure 8:
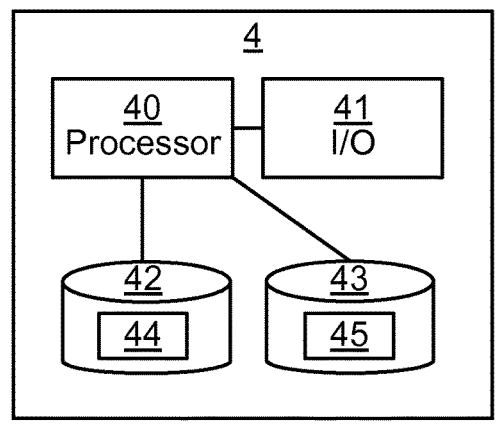
FIG. 8 is a schematic diagram illustrating some components of an escalation server presented herein.

An escalation server, according to an embodiment, for enabling MCPTT services in a telecommunications network 5, is presented with reference to FIG. 8. The escalation server 4 comprises a processor 40, and a memory 42, 43 storing instructions that, when executed by the processor, cause the escalation server to receive S100 an imminent peril or emergency call from at least two proximate MTs, the calls indicating a respective emergency state for the at least two proximate MTs, to determine S110 a number of MTs indicating an emergency state, and to raise S120 an MCPTT emergency alert if the determined number of MTs indicating an emergency state exceeds a threshold.

Figure 9:
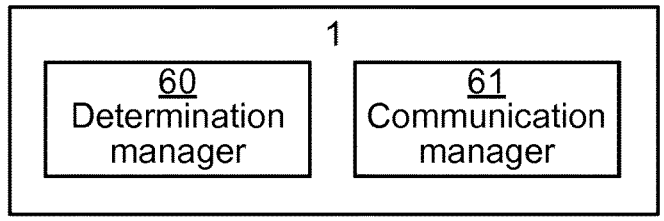
FIG. 9 is a schematic diagram showing functional modules of an MT presented herein.

An MT, according to an embodiment, for enabling MCPTT services in a telecommunications network 5, is presented with reference to FIG. 9. The MT 1 comprises a determination manager 60 and a communication manger 61. The communication manager 61 is for receiving S100 an imminent peril or emergency MCPTT call from at least one other MT, the call indicating an emergency state for the at least one other MT. The determination manager 60 is for determining S110 a number of MTs indicating an emergency state, and for raising S120 an MCPTT emergency alert if the determined number of MTs indicating an emergency state exceeds a threshold.

Figure 10:
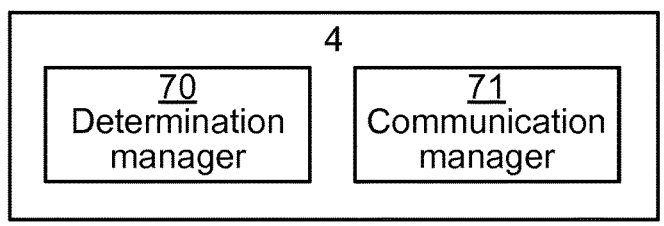
FIG. 10 is a schematic diagram showing functional modules of an escalation server presented herein.

An escalation server, according to an embodiment, for enabling MCPTT services in a telecommunications network 5 is presented with reference to FIG. 10. The escalation server 4 comprises a determination manager 70 and a communication manager 71. The communication manager 71 is for receiving S100 an imminent peril or emergency call from at least two proximate MTs, the calls indicating a respective emergency state for the at least two proximate MTs. The determination manager 70 is for determining S110 a number of MTs indicating an emergency state, and for raising S120 an MCPTT emergency alert if the determined number of MTs indicating an emergency state exceeds a threshold.

A computer program 14, 15, according to an embodiment, for enabling MCPTT services in a telecommunications network 5, is presented. The computer program comprises computer program code which, when run on an MT, causes the MT 1 to receive S100 an imminent peril or emergency MCPTT call from at least one other MT, the call indicating an emergency state for the at least one other MT, to determine S110 a number of MTs indicating an emergency state, and to raise S120 an MCPTT emergency alert if the determined number of MTs indicating an emergency state exceeds a threshold.

A computer program 44, 45, according to an embodiment, for enabling MCPTT services in a telecommunications network 5, is presented. The computer program comprises computer program code which, when run on an escalation server, causes the escalation server 4 to receive S100 an imminent peril or emergency call from at least two proximate MTs, the calls indicating a respective emergency state for the at least two proximate MTs, to determine S110 a number of MTs indicating an emergency state, and to raise S120 an MCPTT emergency alert if the determined number of MTs indicating an emergency state exceeds a threshold.

A computer program product 12, 13, 42, 43 comprising a computer program 14, 15, 44, 45 and a computer readable storage means on which the computer program 14, 15, 44, 45 is stored, is also presented.

FIG. 7 is a schematic diagram showing some components of the MT 1. The processor 10 may be provided using any combination of one or more of a suitable central processing unit (CPU), a multiprocessor, a microcontroller, a digital signal processor (DSP), an application specific integrated circuit (ASIC), etc., capable of executing software instructions of a computer program 14 stored in a memory. The memory can thus be considered to be or form part of the computer program product 12. The processor 10 may be configured to execute methods described herein with reference to FIG. 6.

The memory may be any combination of a random access memory (RAM), and a read-only memory (ROM). The memory may also comprise persistent storage, which, e.g., can be any single one or combination of magnetic memory, optical memory, solid state memory or even remotely mounted memory.

A second computer program product 13 in the form of a data memory may also be provided, e.g., for reading and/or storing data during execution of software instructions in the processor 10. The data memory can be any combination of a RAM and a ROM, and may also comprise persistent storage, which, e.g., can be any single one or combination of magnetic memory, optical memory, solid state memory or even remotely mounted memory. The data memory may, e.g., hold other software instructions 15, to improve functionality for the MT 1.

The MT 1 may further comprise an input/output (I/O) interface ii including, e.g., a user interface. The MT 1 may further comprise a receiver configured to receive signalling from other nodes, and a transmitter configured to transmit signalling to other nodes (not illustrated). Other components of the MT 1 are omitted in order not to obscure the concepts presented herein.

FIG. 9 is a schematic diagram showing functional blocks of the MT 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6, comprising a determination manager unit 60 and a communication manager unit 61. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 60 is for enabling MCPTT services in a telecommunications network 5. This module corresponds to the determine step S110, and the raise step S120 of FIG. 6. This module can e.g. be implemented by the processor 10 of FIG. 7, when running the computer program.

The communication manger 61 is for enabling MCPTT services in a telecommunications network 5. This module corresponds to the receive step S100, and the send step 130 of FIG. 6. This module can e.g. be implemented by the processor 10 of FIG. 7, when running the computer program.

FIG. 8 is a schematic diagram showing some components of the escalation server 4. The processor 40 may be provided using any combination of one or more of a suitable CPU, a multiprocessor, a microcontroller, a DSP, an ASIC, etc., capable of executing software instructions of a computer program 44 stored in a memory. The memory can thus be considered to be or form part of the computer program product 42. The processor 40 may be configured to execute methods described herein with reference to FIG. 6.

The memory may be any combination of a RAM and a ROM. The memory may also comprise persistent storage, which, for example, can be any single one or combination of magnetic memory, optical memory, solid state memory or even remotely mounted memory.

A second computer program product 43 in the form of a data memory may also be provided, e.g., for reading and/or storing data during execution of software instructions in the processor 40. The data memory can be any combination of a RAM and a ROM, and may also comprise persistent storage, which, for example, can be any single one or combination of magnetic memory, optical memory, solid state memory or even remotely mounted memory. The data memory may, e.g., hold other software instructions 45, to improve functionality for the escalation server 4.

The escalation server 4 may further comprise an input/output (I/O) interface 41 including, e.g., a user interface. The escalation server 4 may further comprise a receiver configured to receive signalling from other nodes, and a transmitter configured to transmit signalling to other nodes (not illustrated). Other components of the escalation server 4 are omitted in order not to obscure the concepts presented herein.

FIG. 10 is a schematic diagram showing functional blocks of the escalation server 4. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6, comprising a determination manager unit 70 and a communication manager unit 71. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The determination manger 70 is for enabling MCPTT services in a telecommunications network 5. This module corresponds to the determine step S110, and the raise step S120 of FIG. 6. This module can e.g. be implemented by the processor 40 of FIG. 8, when running the computer program.

The communication manger 71 is for enabling MCPTT services in a telecommunications network 5. This module corresponds to the receive step S100, and the send step 130 of FIG. 6. This module can e.g. be implemented by the processor 40 of FIG. 8, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A mobile terminal, MT, for enabling Mission Critical Push to Talk, MCPTT, services in a telecommunications network including a network node in communication with the MT, the telecommunications network being a carrier aggregation deployment in which a plurality of wireless carriers are available for transmission, the MT comprising:
 a processor; and
 a memory storing instructions that, when executed by the processor, cause the MT to:
  receive one of an imminent peril and an emergency MCPTT call from at least one other MT, the call indicating an emergency state for the at least one other MT, the call being based on at least one measurement of at least one biometric reading of a user, the at least one measurement including at least one of a heartrate reading, a blood pressure reading, a blood glucose reading, and an oxygen saturation reading, the call being autonomously triggered by a failure of the user to manually trigger an emergency transmission before a timer expires, the timer starting when the at least one measurement exceeds at least one predetermined threshold;
  determine a first number of MTs indicating the emergency state;
  raise an MCPTT emergency alert if the determined first number of MTs indicating the emergency state exceeds a second threshold; and
  in response to the MCPTT emergency alert, receive an indication from the network node, the indication causing the MT to move at least one emergency communication to a first set of transmission resources of a first wireless carrier of the plurality of wireless carriers, the first wireless carrier being dedicated to emergency communications, the plurality of wireless carriers including at least one second wireless carrier, the at least one second wireless carrier being dedicated to non-emergency communications, the at least one second wireless carrier being assigned to a plurality of other MTs not indicating an emergency state, the plurality of other MTs being configured to transmit the non-emergency communications on resources of a second set of transmission resources of the at least one second wireless carrier without waiting until resources of the first set of transmission resources are released.

2. The MT according to claim 1, the instructions further causing the MT to send the raised MCPTT emergency alert to a dispatcher through the telecommunications network.

3. The MT according to claim 1, wherein the MT is one of the first number of MTs indicating an emergency state.

4. The MT according to claim 1, wherein the second threshold is a second number of MTs.

5. The MT according to claim 1, wherein the second threshold is a fraction of a total number of MTs in a MCPTT group.

6. The MT according to claim 1, the instructions further causing the MT to send the MCPTT emergency alert to another MT, wherein the other MT and the MT belong to different MCPTT groups.

7. The MT according to claim 1, wherein the telecommunications network is a Long Term Evolution, LTE, network.

8. The MT according to claim 1, wherein the imminent peril or emergency MCPTT call is received as an Off-network MCPTT service.

9. The MT according to claim 1, wherein the emergency state is determined by sensor readings made by the at least one other MT.

10. An escalation server for enabling mission critical push to talk, MCPTT, services in a telecommunications network including a network node, the telecommunications network being a carrier aggregation deployment in which a plurality of wireless carriers are available for transmission, the escalation server comprising:
 a processor; and
 a memory storing instructions that, when executed by the processor, cause the escalation server to:
  receive one of an imminent peril and an emergency MCPTT call at least from a first mobile terminal, MT, of at least two proximate MTs, the call indicating an emergency state at least for one other MT of the at least two proximate MTs, the call being based on at least one measurement of at least one biometric reading of a user, the at least one measurement including at least one of a heartrate reading, a blood pressure reading, a blood glucose reading, and an oxygen saturation reading, the call being autonomously triggered by a failure of the user to manually trigger an emergency transmission before a timer expires, the timer starting when the at least one measurement exceeds at least one predetermined threshold, the emergency state of the one other MT being relayed by the first MT at least to cause a first number of MTs indicating the emergency state to be determined;
  determine the first number of MTs indicating the emergency state based at least in part on the emergency state relayed by the first MT;
  raise an MCPTT emergency alert if the determined first number of MTs indicating the emergency state exceeds a second threshold; and
  in response to the emergency alert, cause the network node to:
   move at least one emergency communication to a first wireless carrier of the plurality of wireless carriers, the first wireless carrier being dedicated to emergency communications;
   move a plurality of non-emergency communications to at least one second wireless carrier of the plurality of wireless carriers, the at least one second wireless carrier being assigned to a plurality of other MTs not indicating an emergency state;
allocate a first set of transmission resources of the first wireless carrier for the at least one emergency communication to the first number of MTs indicating the emergency state;
allocate a second set of transmission resources of the at least one second wireless carrier for the plurality of non-emergency communications to the plurality of other MTs without waiting until resources of the first set of transmission resources are released; and
receive the plurality of non-emergency communications on the second set of transmission resources.

11. The escalation server according to claim 10, the instructions further causing the escalation server to send the raised MCPTT emergency alert to a dispatcher through the telecommunications network.

12. The escalation server according to claim 10, wherein the second threshold is a second number of MTs.

13. The escalation server according to claim 10, wherein the second threshold is a fraction of total number of MTs in a MCPTT group.

14. The escalation server according to claim 10, wherein the telecommunications network is a Long Term Evolution, LTE, network.

15. A non-transitory computer storage medium storing a computer program for enabling Mission Critical Push to Talk, MCPTT, services in a telecommunications network including a network node, the telecommunications network being a carrier aggregation deployment in which a plurality of wireless carriers are available for transmission, the computer program comprising computer program code which, when run on a mobile terminal, MT, in communication with the network node, causes the MT to perform a method comprising:
receiving one of an imminent peril and an emergency MCPTT call from at least one other MT, the call indicating an emergency state for the at least one other MT, the call being based on at least one measurement of at least one biometric reading of a user, the at least one measurement including at least one of a heartrate reading, a blood pressure reading, a blood glucose reading, and an oxygen saturation reading, the call being autonomously triggered by a failure of the user to manually trigger an emergency transmission before a timer expires, the timer starting when the at least one measurement exceeds at least one predetermined threshold;
determining a first number of MTs indicating the emergency state;
raising an MCPTT emergency alert if the determined first number of MTs indicating the emergency state exceeds a second threshold; and
in response to the MCPTT emergency alert, receive an indication from the network node, the indication causing the MT to move at least one emergency communication to a first set of transmission resources of a first wireless carrier of the plurality of wireless carriers, the first wireless carrier being dedicated to emergency communications, the plurality of wireless carriers including at least one second wireless carrier, the at least one second wireless carrier being dedicated to non-emergency communications, the at least one second wireless carrier being assigned to a plurality of other MTs not indicating an emergency state, the plurality of other MTs being configured to transmit the non-emergency communications on resources of a second set of transmission resources of the at least one second wireless carrier with waiting until resources of the first set of transmission resources are released.

16. A non-transitory computer storage medium storing a computer program for enabling Mission Critical Push to Talk, MCPTT, services in a telecommunications network including a network node, the telecommunications network being a carrier aggregation deployment in which a plurality of wireless carriers are available for transmission, the computer program comprising computer program code which, when run on an escalation server, causes the escalation server to perform a method comprising:
receiving one of an imminent peril and an emergency MCPTT call at least from a first mobile terminal, MT, of at least two proximate MTs, the call indicating an emergency state at least for one other MT of the at least two proximate MTs, the call being based on at least one measurement of at least one biometric reading of a user, the at least one measurement including at least one of a heartrate reading, a blood pressure reading, a blood glucose reading, and an oxygen saturation reading, the call being autonomously triggered by a failure of the user to manually trigger an emergency transmission before a timer expires, the timer starting when the at least one measurement exceeds at least one predetermined threshold, the emergency state of the one other MT being relayed by the first MT at least to cause a first number of MTs indicating the emergency state to be determined;
determining the first number of MTs indicating the emergency state based at least in part on the emergency state relayed by the first MT;
raising an MCPTT emergency alert if the determined first number of MTs indicating the emergency state exceeds a second threshold; and
in response to the emergency alert, causing the network node to:
move at least one emergency communication to a first wireless carrier, the first wireless carrier being dedicated to emergency communications;
move a plurality of non-emergency communications to at least one second wireless carrier of the plurality of wireless carriers, the at least one second wireless carrier being assigned to a plurality of other MTs not indicating an emergency state;
allocate a first set of transmission resources of the first wireless carrier for the at least one emergency communication to the first number of MTs indicating the emergency state;
allocate a second set of transmission resources of the at least one second wireless carrier for the plurality of non-emergency communications to the plurality of other MTs without waiting until resources of the first set of transmission resources are released; and
receive the plurality of non-emergency communications on the second set of transmission resources.

17. The non-transitory computer storage medium according to claim 15, wherein the MT is one of the first number of MTs indicating an emergency state.

18. The non-transitory computer storage medium according to claim 15, wherein the second threshold is a second number of MTs.

19. The non-transitory computer storage medium according to claim 16, wherein the second threshold is a second number of MTs.

20. The non-transitory computer storage medium according to claim 16, wherein the second threshold is a fraction of total number of MTs in a MCPTT group.

* * * * *